(12) United States Patent
Guthrie et al.

(10) Patent No.: US 8,364,992 B2
(45) Date of Patent: Jan. 29, 2013

(54) METHOD AND SYSTEM FOR REDUCING POWER CONSUMPTION BY COMMAND SELECTION IN A HARD DISK DRIVE

(75) Inventors: William Guthrie, San Jose, CA (US); Nyles Heise, San Jose, CA (US); Hung M. Vu, Fremont, CA (US)

(73) Assignee: HGST, Netherlands B.V., Amsterdam (NL)

( * ) Notice: Subject to any disclaimer, the term of this patent is extended or adjusted under 35 U.S.C. 154(b) by 677 days.

(21) Appl. No.: 12/323,072

(22) Filed: Nov. 25, 2008

(65) Prior Publication Data

US 2010/0128381 A1 May 27, 2010

(51) Int. Cl.
*G06F 1/26* (2006.01)
*G06F 12/00* (2006.01)
(52) U.S. Cl. ........ 713/320; 713/300; 713/310; 711/111; 711/112; 711/151; 711/152
(58) Field of Classification Search .................. 713/300, 713/310, 320; 711/111, 112, 151, 158
See application file for complete search history.

(56) References Cited

U.S. PATENT DOCUMENTS

| | | | |
|---|---|---|---|
| 5,787,296 A | 7/1998 | Grimsrud et al. | |
| 6,038,096 A | 3/2000 | Zhang et al. | |
| 6,310,743 B1 | 10/2001 | Haines et al. | |
| 6,571,298 B1 | 5/2003 | Megiddo | |
| 6,657,811 B1 | 12/2003 | Codilian | |
| 6,724,564 B1 | 4/2004 | Codilian et al. | |
| 6,851,011 B2 * | 2/2005 | Lin | 711/4 |
| 7,010,653 B2 * | 3/2006 | Uchida et al. | 711/158 |
| 7,199,966 B1 | 4/2007 | Tu et al. | |
| 7,925,799 B2 * | 4/2011 | Komori | 710/22 |
| 7,948,264 B2 * | 5/2011 | Wang et al. | 326/38 |
| 2003/0084261 A1 * | 5/2003 | Byrd et al. | 711/167 |
| 2003/0174433 A1 * | 9/2003 | Espeseth et al. | 360/78.07 |
| 2003/0225969 A1 * | 12/2003 | Uchida et al. | 711/112 |
| 2004/0019745 A1 * | 1/2004 | Espeseth et al. | 711/137 |
| 2004/0030827 A1 * | 2/2004 | Hall | 711/113 |
| 2004/0268169 A1 * | 12/2004 | Bashford et al. | 713/320 |
| 2008/0005398 A1 * | 1/2008 | Huffman | 710/39 |
| 2010/0011137 A1 * | 1/2010 | McGowan | 710/105 |
| 2011/0010573 A1 * | 1/2011 | Igari | 713/323 |

FOREIGN PATENT DOCUMENTS

JP  2003-308176  10/2003

OTHER PUBLICATIONS

Zedlewski, et al., "Modeling Hard-Disk Power Consumption", *2nd USENIX Conference on File and Storage Technologies* pp. 217-230, Date 2003, http://www.cs.princeton.edu/~rywang/papers/fast03/dempsey.pdf, (2003),217-230.

Hong, et al., "Power Optimization in Disk-Based Real Time Application Specific System" *Computer Science Department, University of California, Los Angeles, CA* ftp://ftp.cs.ucl.edu/tech-report/1996-reports/960025.ps.Z. (1996),25 pages.

* cited by examiner

*Primary Examiner* — Kim Huynh
*Assistant Examiner* — Zahid Choudhury (57) ABSTRACT

A system and method for providing a command queue selection scheme by selecting commands by giving preference to commands based on the power consumption characteristics the command. In one embodiment the selection scheme involves calculating the value of the cost of energy saving associated with the access of a command by an evaluation function Costi=EAT+C×F1 (seek distance, latency). C is a dynamically adjustable power control function that determines how much power decreases with the selection of a particular command and F1 is a functional calculation of the power consumption value associated with the particular command. In one embodiment commands with low power consumption will be accessed in preference to commands with shorter seek distance.

22 Claims, 11 Drawing Sheets

METHOD AND SYSTEM FOR REDUCING POWER CONSUMPTION BY COMMAND SELECTION IN A HARD DISK DRIVE

TECHNICAL FIELD

The present invention relates to the field of conditioning reducing power consumption in data storage devices, and more particularly to an improved method and system for re-ordering a command queue in preferential writing and reading data based on the power consumption characteristics of a particular command.

BACKGROUND ART

Hard disk drives (HDD) are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm with a suspended slider is utilized to reach out over the disk. The slider is coupled with a suspension that supports both the body of the slider and a head assembly that has a magnetic read/write transducer or head or heads for reading/writing information to or from a location on the disk. The complete head assembly, e.g., the suspension, slider, and head, is called a head gimbal assembly (HGA).

A typical HDD uses the actuator assembly to move magnetic read/write heads to the desired location on the rotating disk so as to write information to or read from the location. Within most HDDs, the magnetic read/write head is mounted on a slider. The slider generally serves to mechanically support the head and any electrical connections between the head and the rest of the disk drive. The slider is aerodynamically shaped to establish an air lubrication film in order to maintain a uniform distance from the surface of the rotating disk, thereby preventing the head from undesirably contacting the disk.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is substantially proportional to the magnitude of the current. As the read/write head approaches a desired track, a reverse polarity signal is applied to the actuator, causing the signal to act as a brake, and ideally causing the read/write head to stop and settle directly over the desired track.

The reading or writing of data is performed in accordance with a write command and a read command transferred from a host system. The hard disk drive re-orders a command queue as one of the performance improving techniques. That is, the command queue of write commands and read commands transferred sequentially from the host system is re-ordered so that the latency required to execute the writing or reading command may be minimized.

Various methods for re-ordering the command queue in the hard disk drive have been already offered. They are roughly classified into a method for improving the I/O throughput (amount of work performed over a period of time) and a method for preventing the time-out of command caused by re-ordering the command. And the method for improving the I/O throughput is further classified into a case where the seek time is longer than the rotational latency and a case where the seek time is almost equivalent to the rotational latency.

All the above re-ordering techniques are implemented in one way or the other to improve performance and to save power. The premium for saving power consumption in hard disk drive have transcended across the various platforms (e.g., from mobile computers to server computer products). Conventional methods for power saving or reduction include JIT (Just In Time seek technology). This method delays the seek time by an amount of the rotational latency to make power save and enhance performance. Other conventional methods involve directly switching the seek method (including servo parameters) between a performance mode and a silent mode.

These methods are very effective but require to have parameters for the servo system duplicated, and therefore have a significant drawback of taking a great burden on the development because it must be checked that the seek is normally made for all combinations of the seek distance and the latency.

SUMMARY

In accordance with certain aspects of the present invention, the present invention provides a system and method for providing a command queue selection scheme by selecting commands by giving preference to commands based on the power consumption characteristics the command. In one embodiment the selection scheme involves calculating the value of the cost of energy saving associated with the access of a command by an evaluation function $Cost_i = EAT + C \times Seek\_Distance$. C is a dynamically adjustable power control function that determines how much power decreases with the selection of a particular command. In one embodiment, commands with low power consumption will be accessed in preference to commands with shorter seek distance.

In one embodiment, the adjustable power consumption variable is multiplied by a function of other power consumption variables of the commands in the command queue. In one embodiment, the power consumption function is determined using the latency in seeking a particular command.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a hard disk drive and components connected therewith. The discussion will then focus on embodiments of a method and system for decreasing power consumption in command selection of commands from a command queue.

Overview

In general, the HDD comb (also referred to as an E-block) serves as a platform on which the suspensions (compliant members containing sliders with recording heads) are mounted. The recording heads fly at a constant height (on the order of nanometers) above the disk surface tracking pre-written servo information. An HDD carriage assembly (as shown in FIG. 1) forms the primary motive mechanical system that enables a disk-drive to randomly access data to be written or recorded on the disk surfaces.

Figure 1:
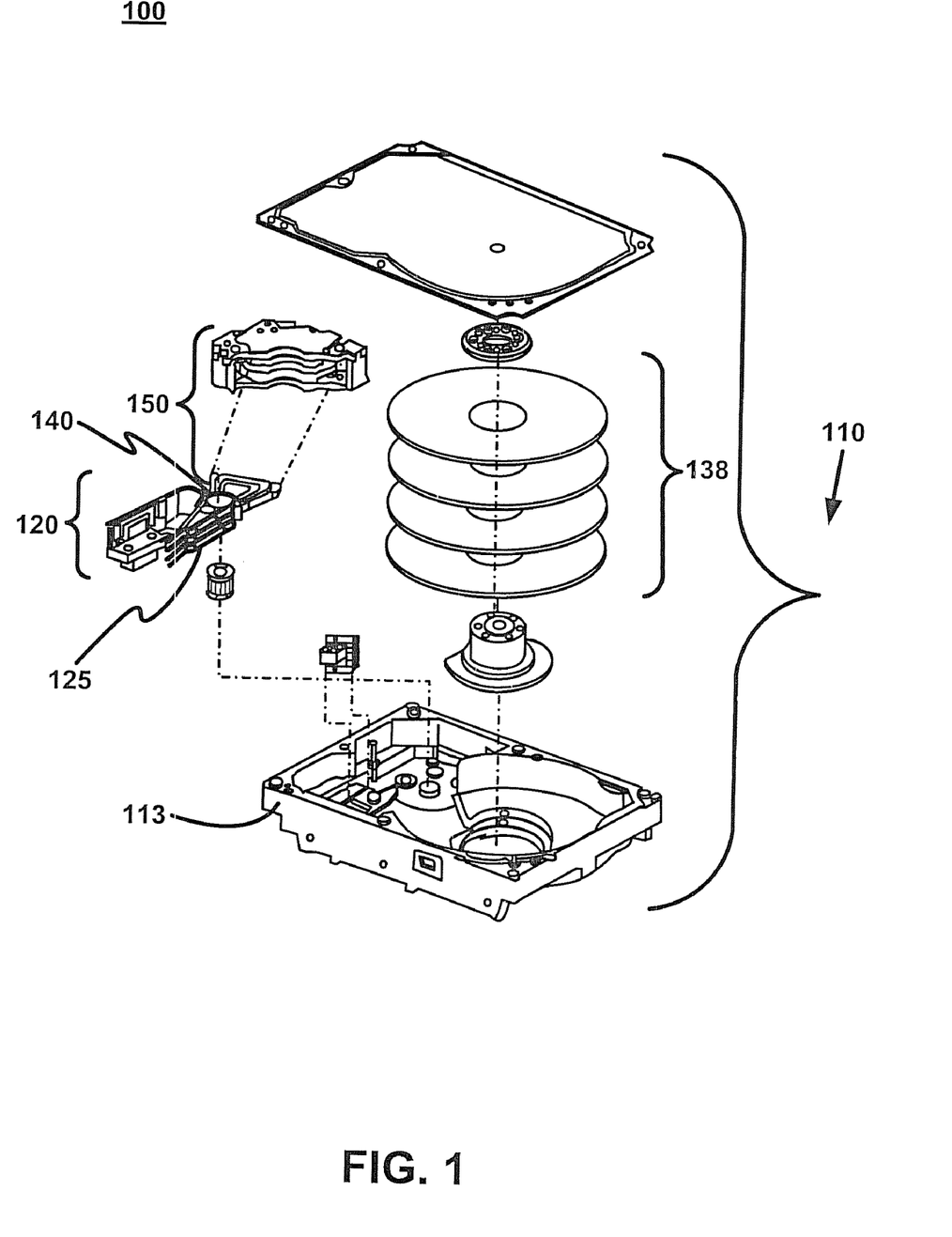
FIG. 1 is a plan view of an HDD with cover and top magnet removed with a serial identification label affixed to it in accordance with one embodiment of the present invention.

With reference now to FIG. 1 a schematic drawing of one embodiment of an information storage system including a magnetic hard disk file or drive 110 for a computer system is shown. Hard disk drive 110 has an outer housing or base 113 containing a disk pack having at least one medium or magnetic disk 138. The disk pack (as represented by disk 138) defines an axis of rotation and a radial direction relative to the axis in which the disk pack is rotatable.

A spindle motor assembly having a central drive hub 140 operates as this axis and rotates the disk 138 or disks of the disk pack in the circumferential direction relative to housing 113. An actuator 120 includes a plurality of parallel actuator arms 125 in the form of a comb that is movably or pivotally mounted to base/housing 113 about a pivot assembly 145. A magnet assembly 150 is also mounted to base 113 for selectively moving the comb of arms relative to the disk pack (as represented by disk 138).

In the embodiment shown in FIG. 1, each drive is affixed with an identification code, preferably a bar-coded label storing a unique serial number associated with the particular drive. The identification code could also include other information which an operator may be able to use to detect a drive in the manufacturing environment.

Figure 2:
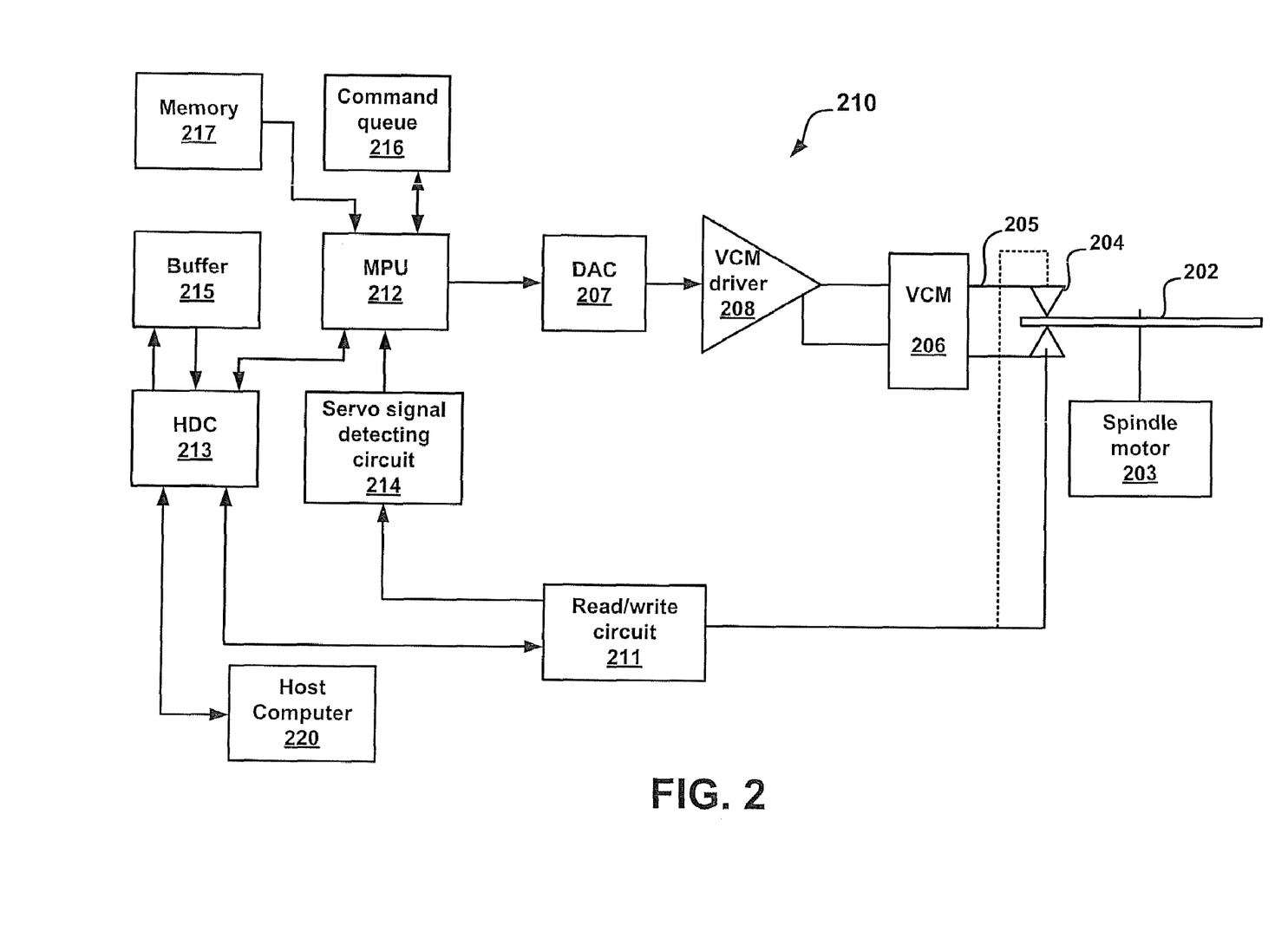
FIG. 2 is a block diagram illustrating a configuration of one embodiment of a hard disk drive in accordance with one embodiment of the present invention.

Referring now to FIG. 2 is a block diagram showing a principal portion of a hard disk drive 200 in accordance with one embodiment of the present invention. The Hard disk drive 200 is a data storing/reproducing unit for enabling a magnetic head 204 to seek on a magnetic disk 202 that is driven and rotated by a spindle motor 203 to be located in a predetermined track (position) and write the data into the magnetic disk 202 or read the data written in the magnetic disk 202. One or more magnetic disks 202 are mounted, as needed, but a single magnetic disk 202 is adopted in the embodiment.

The magnetic disk 202 is rotated around a spindle axis of the spindle motor 203, when the hard disk drive 200 is operated, and stopped when the hard disk drive 200 is inactive. A plurality of positional information (servo information) storage areas are formed radially on the surface of the magnetic disk 202 along a radial direction of the disk, and a data storage area is formed in the other region. The location of the magnetic disk 204 can be known by reading the servo information. The servo information is composed of track identification data and burst patterns.

The track identification information represents a track address of each data track. The magnetic head 204 reads this track information to determine a current track location of the magnetic head 204. A burst pattern consists of a plurality of rows of signal storing regions each having a different phase, which are arranged at a regular interval along a radial direction of the magnetic disk 202. The deviation amount of the magnetic head 204 off the data track can be determined on the basis of a signal output from the burst pattern.

The read/write circuit 211 performs the data reading/writing process. Namely, the write data transferred via an HDC (hard disk controller) 213 from a host computer 220 is converted into a write signal (electric current) and supplied to the magnetic head 204. The magnetic head 204 writes the data into the magnetic disk 202, on the basis of this write current. On the other hand, a read signal read from the magnetic disk 202 is converted into the digital data and output via the HDC 213 to the host computer 220.

A command queue 216 holds the write commands stored in buffer 215, or the order of executing the write command. This order of executing is determined by MPU 212 and the HDC 213. The write data or read data stored in the buffer 215 is written or read sequentially into or from the magnetic disk 202 in accordance with the executing order held in the command queue.

In one embodiment, the re-ordering method of the present invention provides a mechanism to re-order the command queue 216 with a preference for saving power consumption in the processing of data written to or read from the magnetic disk 202. The power saving mechanism of the present invention provides a method of preferentially writing or reading the commands with low power consumption during each queue sequence.

The power consumption reduction command selection method of one embodiment of the present invention provides command selection by choosing a command that has minimum power cost. In one embodiment the power cost equation is defined by a cost equation as follows:

$$COST_i = EAT_i \quad (1)$$

where EAT (expected access time) is

EAT=Expected seek time+expected rotation time+ probability of miss×1Rev.

The cost of each command in the command queue is calculated and the command with the lowest energy cost is always given preference.

In one embodiment of the present invention, each command in the command queue has an associating power consumption variable. By including a term for power, preference is given to commands that use less power. Thus, a smaller power command may be chosen over a command that takes less time to process. In one embodiment, the basic power saving equation is defined by the following power selection equation:

$$Cost = EAT + C \times R \quad (2)$$

Where EAT is the expected access time, C is an adjustable constant that control how much power decreases in each command and R is an estimate of the energy required for a particular seek.

In one embodiment, C is dynamically adjustable based on the command queue depth. In one embodiment when C=0, the cost is not affected by power. As C increases, more emphasis is given to power over EAT. And when C is very large power completely controls command selection. In one embodiment, C is a function of the command queue depth.

Alternatively, the power selection equation could be calculated utilizing the dynamic adjustable power factor (C) and a function of other characteristics of the commands being processed in the command queue. In this alternative, the cost equation is represented by the following:

$$Cost = EAT + C \times F1 \quad (3)$$

Where F1 is a function of the seek distance, the latency, the processing time of a particular command, etc.

Figure 3:
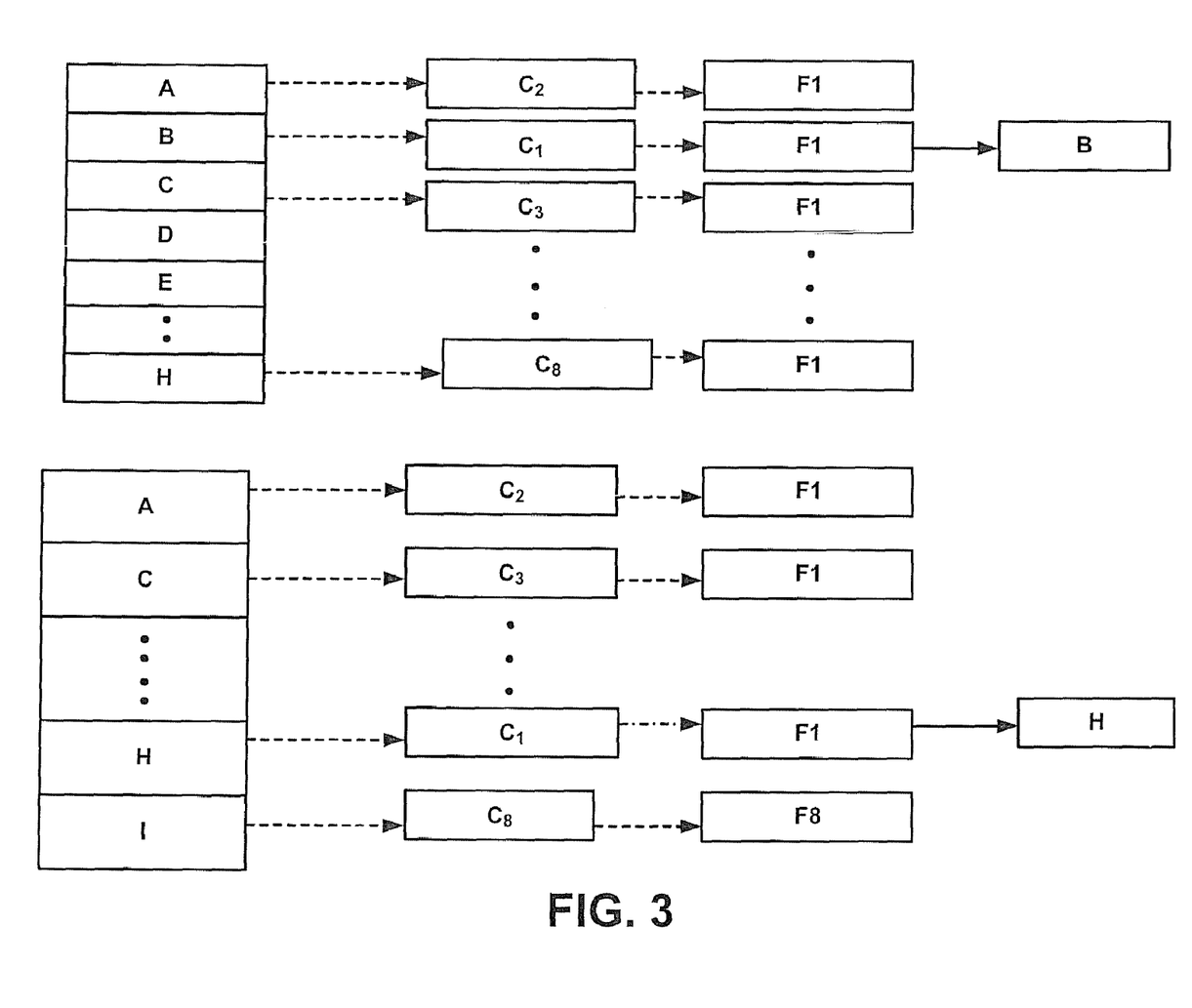
FIG. 3 is a diagram illustrating one embodiment of the data re-ordering method in accordance with one embodiment of the present invention.
Figure 4:
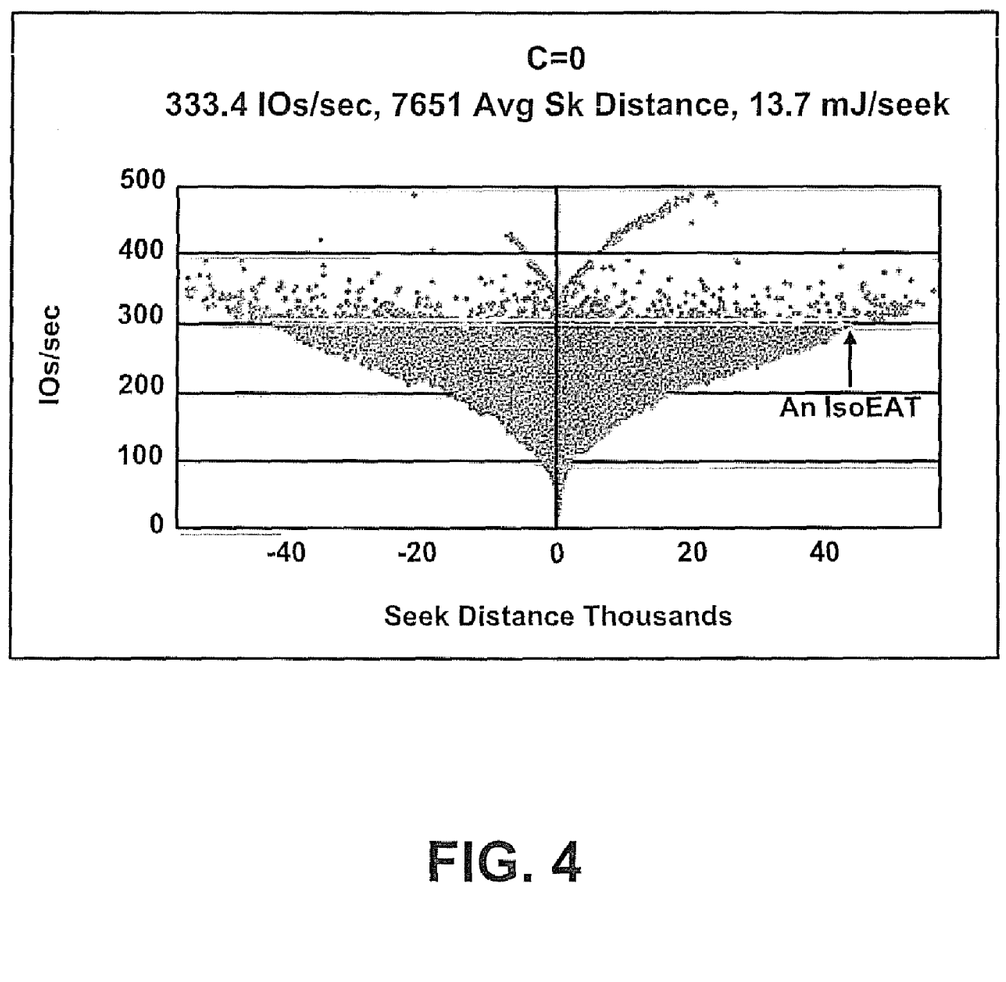
FIG. 4 is a graph illustrating a command I/O and distribution with respect to the seek distance with the power consumption knob adjusted to zero in accordance with one embodiment of the present invention.
Figure 5:
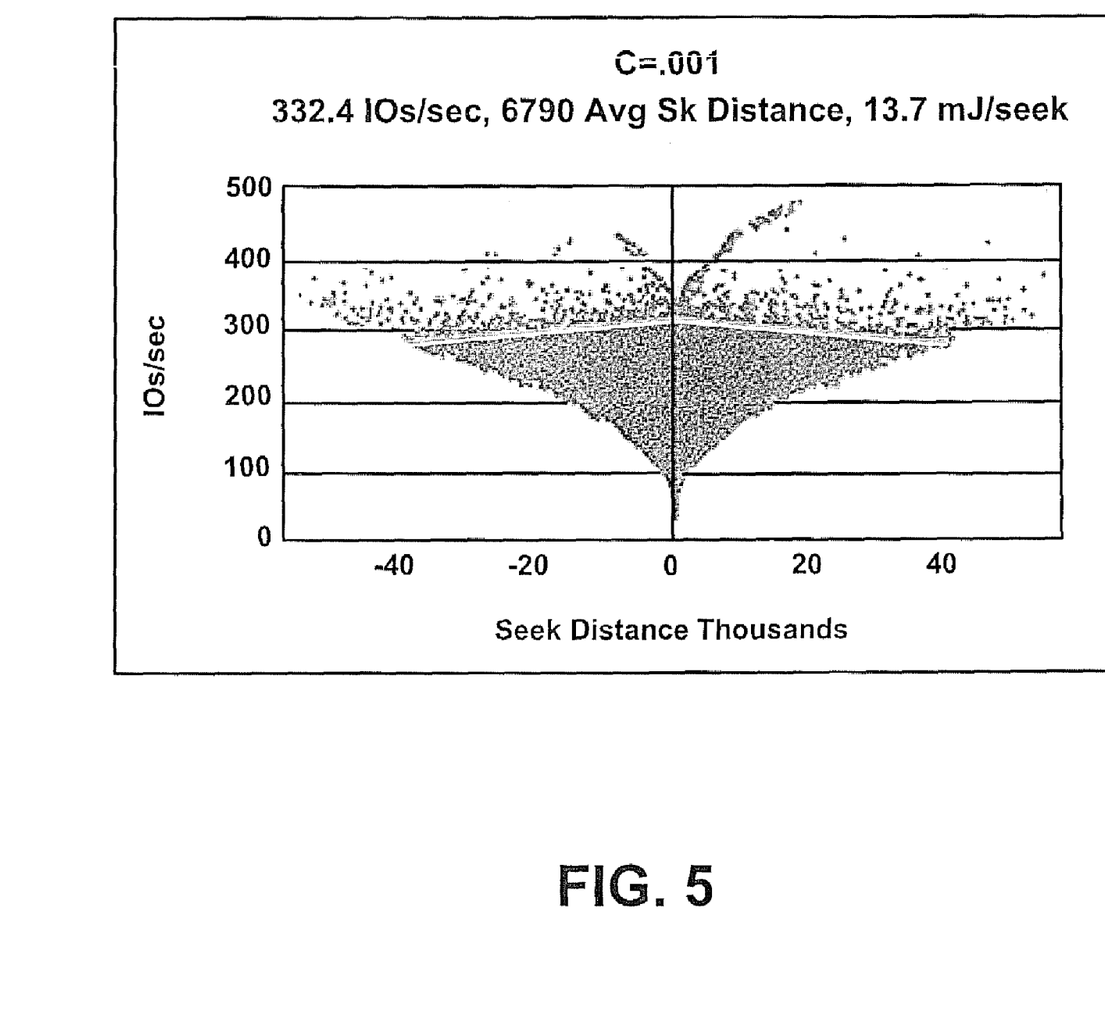
FIG. 5 is a graph illustrating a command I/O and distribution with respect to the seek distance with the power con
Figure 6:
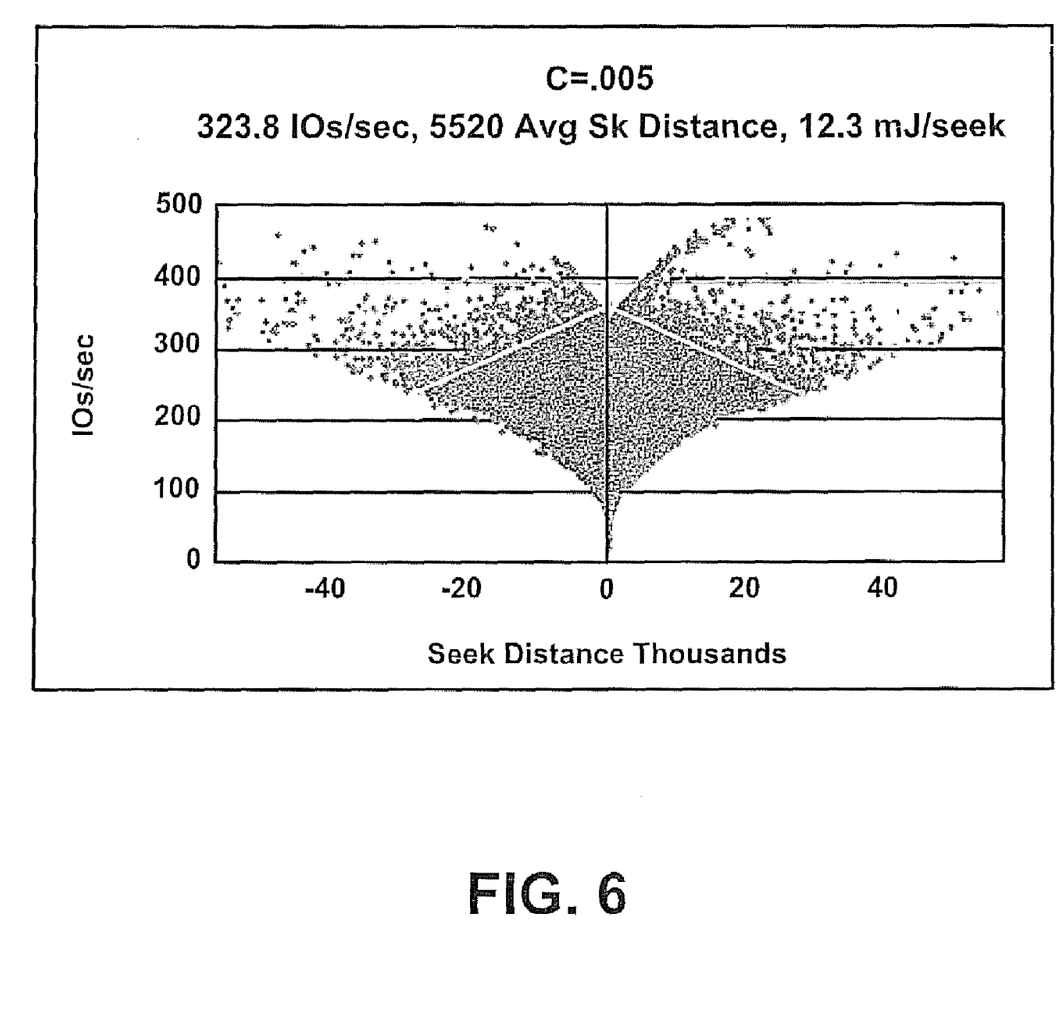
- FIG. 6 is a graph illustrating a command I/O and distribution with respect to the seek distance with the power consumption knob adjusted to 0.005 in accordance with one embodiment of the present invention.
Figure 7:
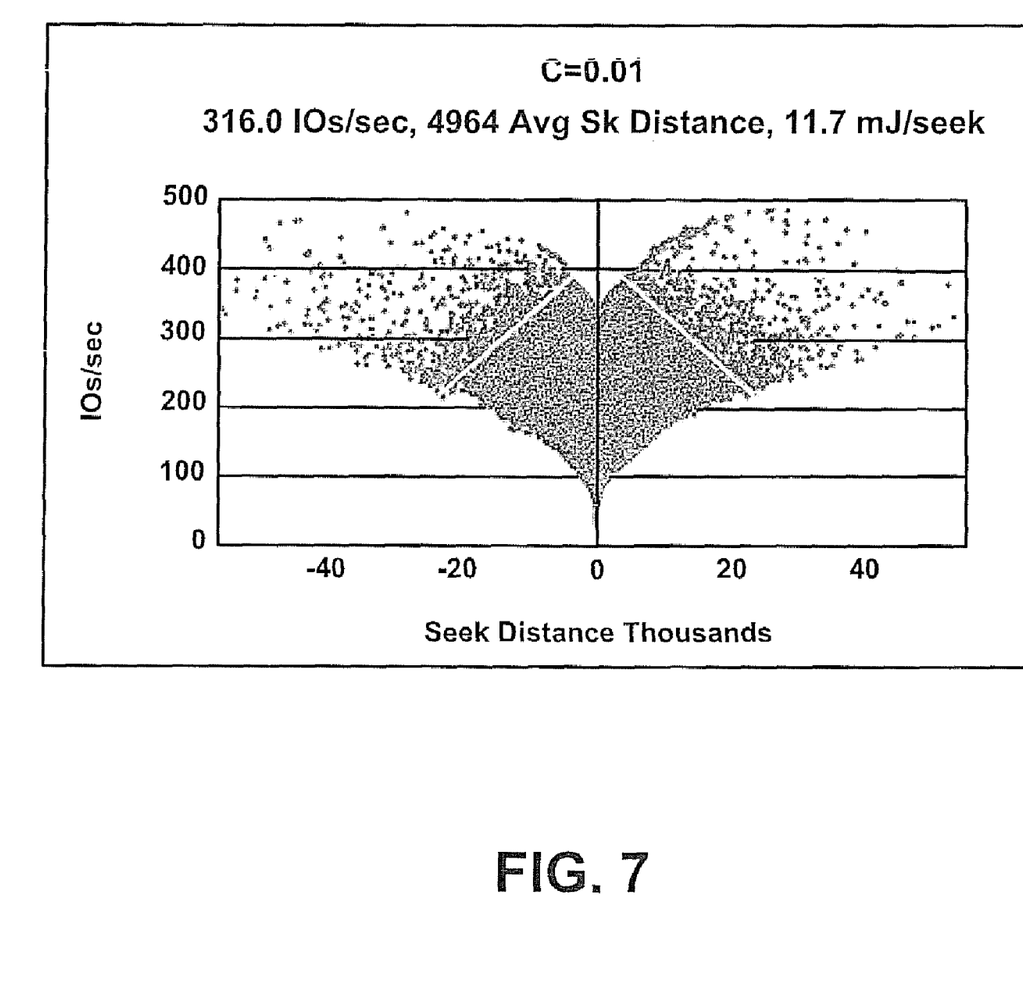
FIG. 7 is a graph illustrating a command I/O and distribution with respect to the seek distance with the power consumption knob adjusted to 0.01 in accordance with one embodiment of the present invention.
Figure 8:
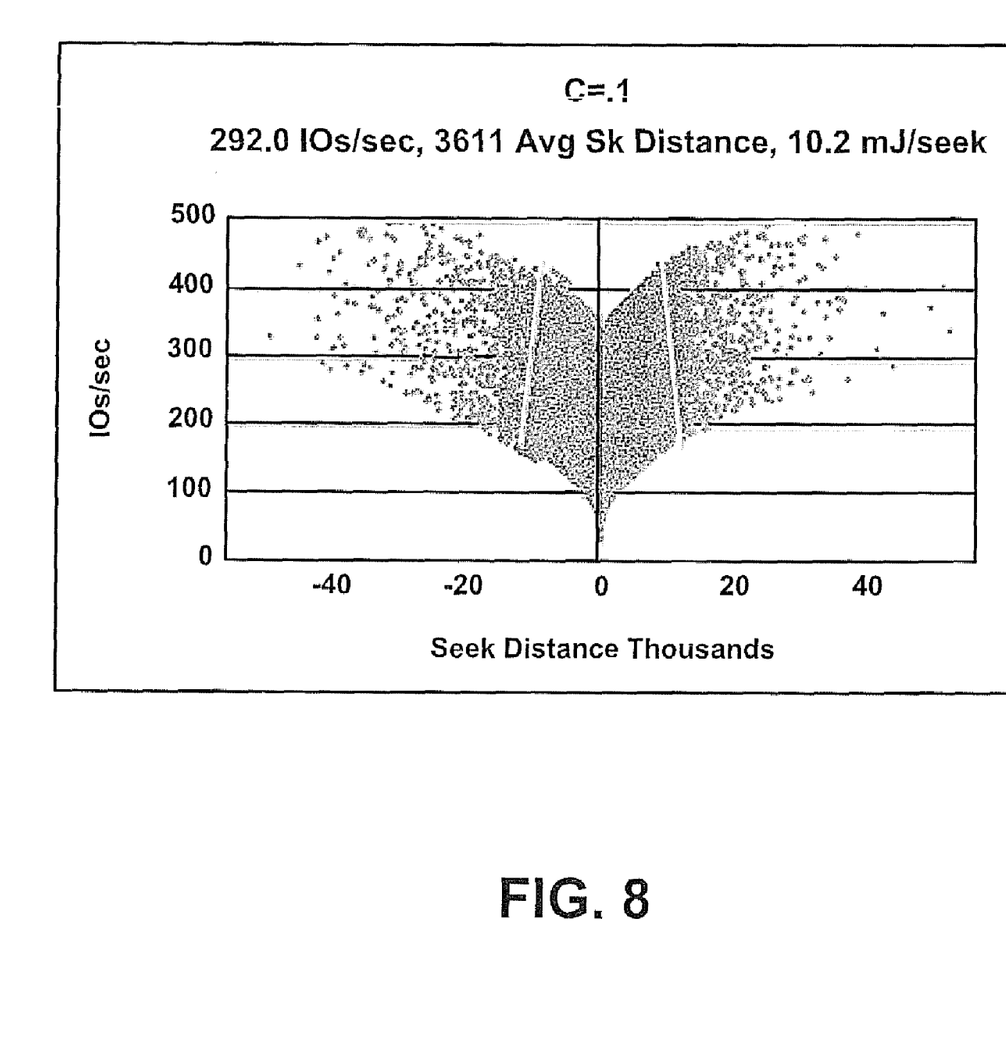
FIG. 8 is a graph illustrating a command I/O and distribution with respect to the seek distance with the power consumption knob adjusted to 0.1 in accordance with one embodiment of the present invention.
Figure 9:
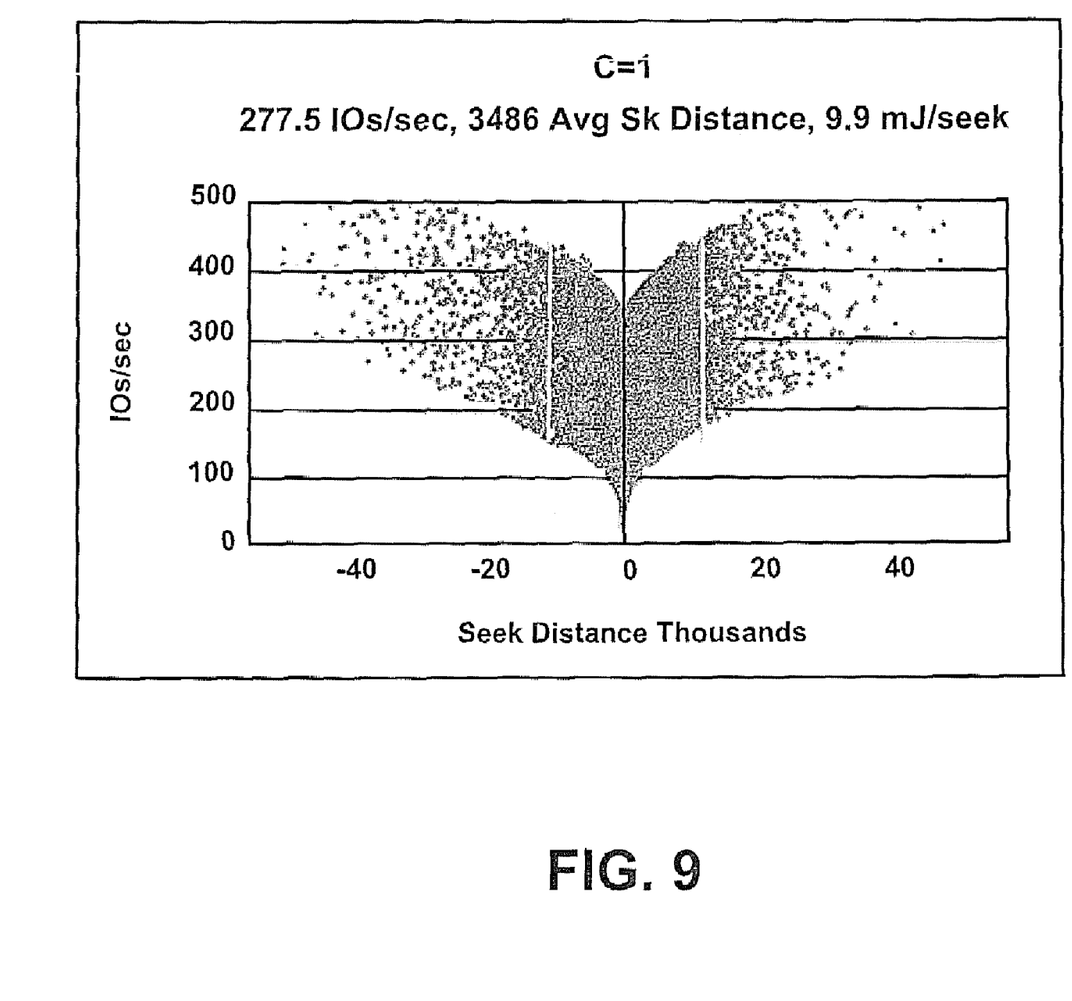
FIG. 9 is a graph illustrating a command I/O and distribution with respect to the seek distance with the power consumption knob adjusted to one in accordance with one embodiment of the present invention.

FIG. 3 is a block diagram illustrating one embodiment of the command queue re-ordering of one embodiment of the present invention. As shown in FIG. 3, the depth m of the command queue is 8, and the number n of commands to be extracted is 1. It is supposed in the embodiment shown in FIG. 3 that the commands A, B, C, D, . . . H are held in the command queue 216. For the eight commands, the power consumption factor and the power consumption characteristic are calculated. In FIG. 3, C in a column of power (C) denotes the power consumption of the particular command and is suffixed with a smaller number for the low power consumption.

In the embodiment illustrated in FIG. 3, the column F represents the energy estimation of a particular command which is calculated as a functional calculation of different parameters of the commands in the command queue. In one embodiment, the parameter may be the seek distance of a particular command. In one embodiment, the parameter may be the latency. In one embodiment, the parameter may be the time to process the command.

In the command selection illustrated in FIG. 3, commands are selected based on the low energy variable of the command in the command queue. For example, when the commands are queued, command B has a low power consumption variable and will be accessed ahead of command A which is at the head of the queue (step 1). In a subsequent access (e.g., Step 2), when commands are re-ordered, command D has a low energy variable or low power consumption factor and will be accessed ahead of commands A and C although commands A and C are ahead in the command queue. This is important because unlike conventional re-ordering schemes where latency plays an essential role in command selection, the present command selection scheme only give preference to low power consuming commands without much weight to the latency of the command. Furthermore, commands are not selected by virtue of being ahead in the command queue if the power cost of the command is high.

FIGS. 4-9 are graphs illustrating the relationship between command I/O and the command seek distance. The relation is represented by the whale tail diagram in the graphs in FIGS. 4-9. As shown in all the graphs, the whale tail changes as a function of C when F is used. As illustrated in FIGS. 4-9, the results of executing X commands in which one point corresponds to one command. As C is varied from 0 in FIG. 4 where the energy cost is not affected to 1 in FIG. 9 where there is an overwhelming energy effect. The results for C>1 are the same as those for C=1. At these values, seek time and latency have no effect on command selection.

Figure 10:
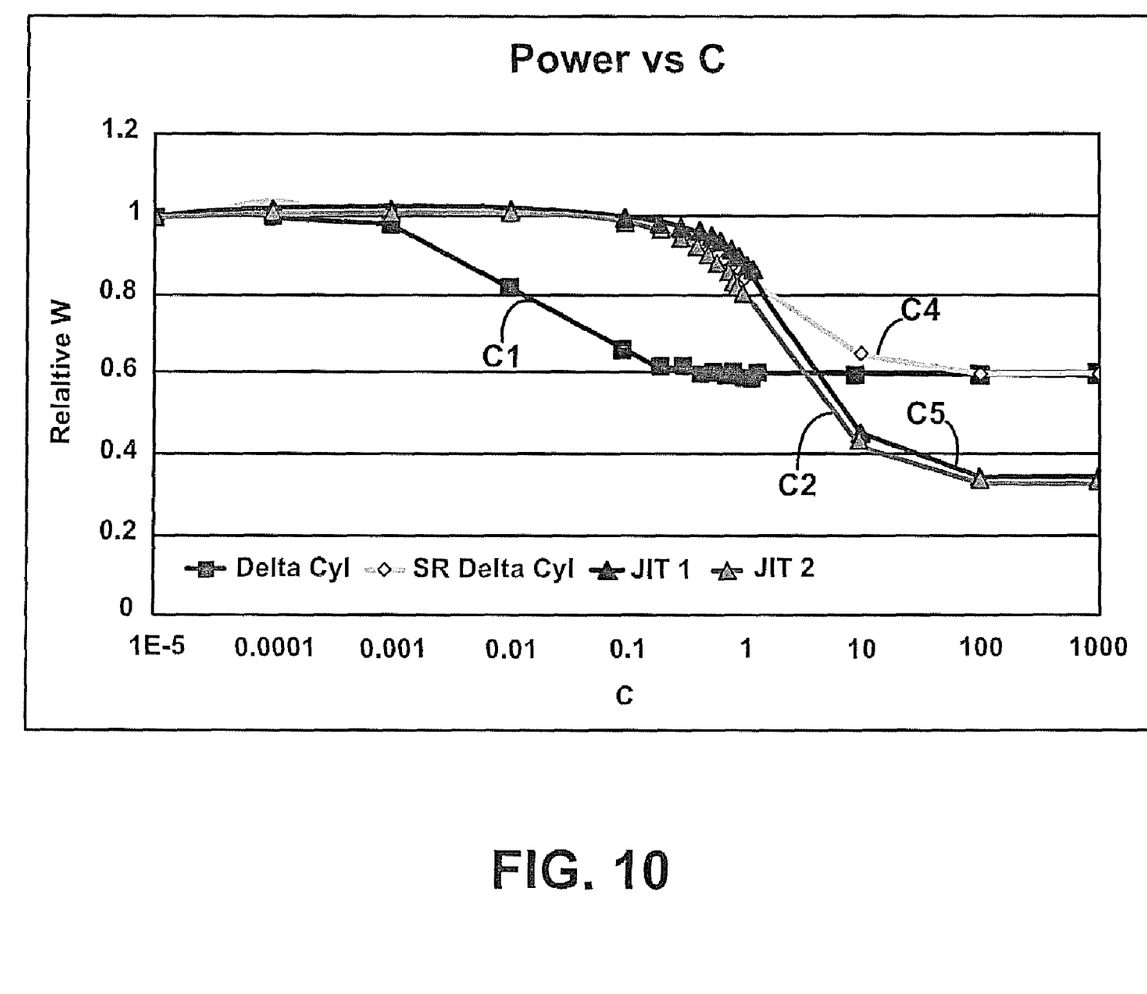
FIG. 10 is a graph illustrating the adjustable power knob with a command queue with a queue depth of 16 in accordance with one embodiment of the present invention.

FIG. 10 is a graph illustrating the relationship between power consumption and the dynamically adjustable power knob (C). As illustrated in FIG. 10, in one embodiment, as C increases, the power decrease making the associated command preferable. When C is very small, none of the four functions of the cost equation decreases the power variable.

As C increases, the F1 function is the first to show a decrease in power. And at a very large C, two different power numbers are realized; one when JIT is taken into account; and the other when JIT is not a factor.

Figure 11:
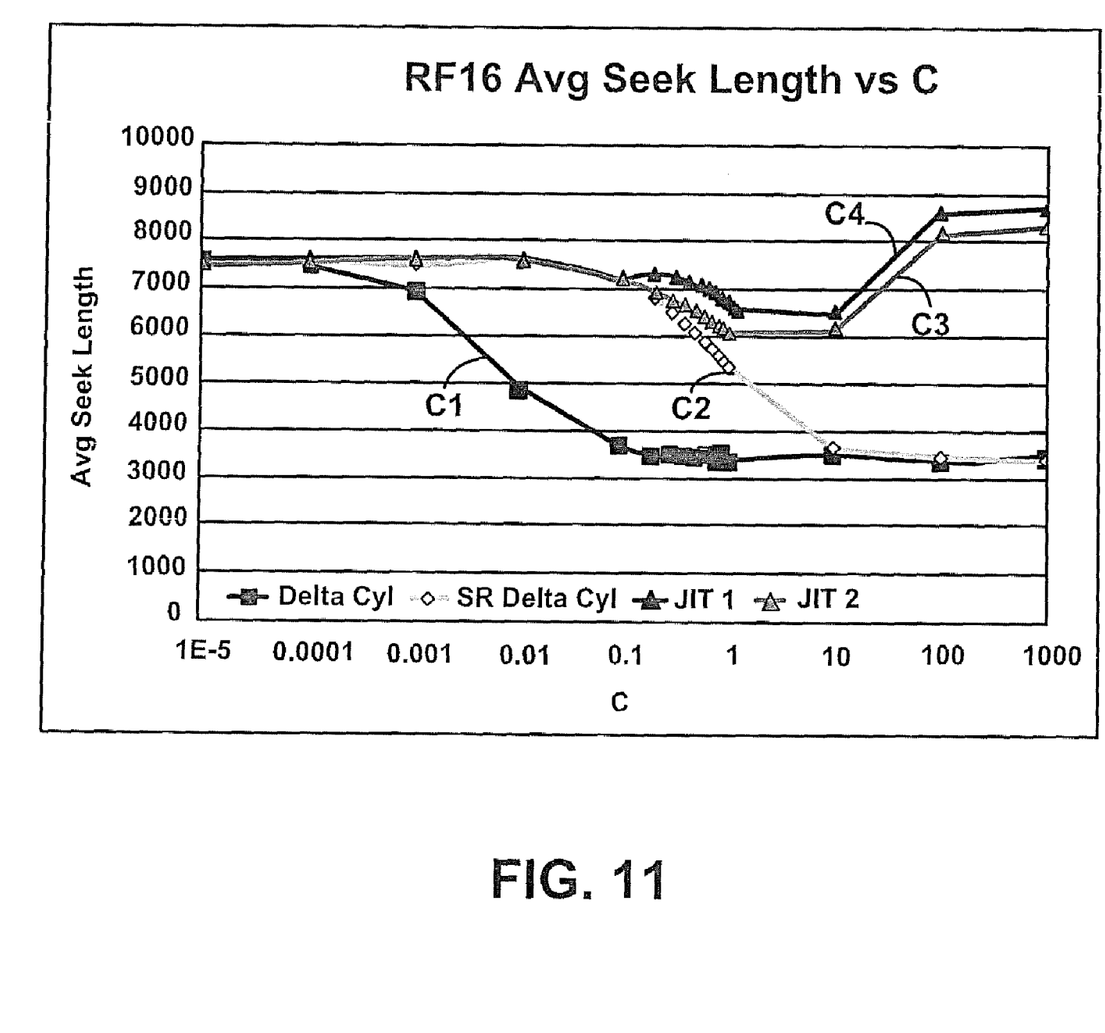
FIG. 11 is a graph illustrating the adjustable power knob with a command queue with a queue depth of 16 in accordance with one embodiment of the present invention.

FIG. 11 is a graphical illustration of the relation between the average seek length and the adjustable power knob in one embodiment of the present invention. As shown in FIG. 11, all functions of the power cost equation use some form of seek distance to estimate energy. Thus preference is first given to commands with shorter seek distances. For medium values of C, the seek distance decreases as C increase.

In one embodiment, when C is very large and JIT is taken into account, latency does not affect the cost equation and long latency commands are considered.

Thus, embodiments of the present invention provide a method and apparatus for command selection from a command queue by giving preference to commands with low power cost.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A hard disk drive comprising:
a plurality of storage media into which data is accessed;
a plurality of read/write heads for writing to and reading from the plurality of storage media;
a data command queue for queuing commands written by and read by the read/write heads to and from the plurality of storage media; and a command selector for specifying selection of said commands from said data command queue by giving preference to low power consuming commands, said command selector configured for determining power consumption of one of said commands based on a dynamically adjustable power consumption variable associated with each of the commands in the data command queue, wherein said dynamically adjustable power consumption variable is a function of a queue depth of said command queue, said power consumption variable is automatically adjusted, based on said depth of said command queue.

2. The hard disk drive of claim 1, wherein the commands queued in the data command queue each has an associating power consumption variable to indicate the power consumed in processing the command.

3. The hard disk drive of claim 2, further comprising a dynamically adjustable power consumption knob associated with said dynamically adjustable power consumption variable for controlling how much power decreases with each associated command.

4. The hard disk drive of claim 3, wherein if a power consumption preference is set low, command selection preference is given to the associated command.

5. The hard disk drive of claim 4, wherein as the dynamically adjustable knob increases, more emphasis is given to the power consumed by a particular command being written or being read over the expected access time of the particular command being written or being read.

6. The hard disk drive of claim 1, wherein the command queue has depth of eight commands.

7. A data storage device, comprising:
a plurality of disks;
a plurality of read/write heads for writing to and reading from the plurality of disks;
data command queue for queuing commands written by and read by the read/write heads to and from the plurality of disks; and
a command preference selector for specifying selection of said commands from said data command queue by giving preference to low power consuming commands said command preference selector configured for determining power consumption of one of said commands based on a dynamically adjustable power consumption variable associated with each of the commands in the data command queue, wherein said dynamically adjustable power consumption variable is a function of a queue depth of said command queue, said power preference selector is automatically adjusted, based on said queue depth of said command queue.

8. The data storage device of claim 7, wherein the commands queued in the data command queue each has an associated power consumption factor based on said dynamically adjustable power consumption variable to indicate the power consumed in processing the command.

9. The data storage device of claim 8, wherein the associating power consumption factor ranges in value from zero (0) to one (1).

10. The data storage device of claim 9, wherein the commands queued in the data command queue each further has an associating energy estimator which is calculated as a function of one of the variables of the command.

11. The data storage device of claim 10 wherein the function of variables include seek distance information of a particular command.

12. The data storage device of claim 11, wherein the function of variables further include latency information of the particular command.

13. The data storage device of claim 12, wherein the function of variables further include time available.

14. The data storage device of claim 13, wherein the data command queue has a depth of 8 commands.

15. The data storage device of claim 14, wherein the function of variables further include an available time to process the particular command.

16. A method of reducing power consumption in processing commands in hard disk drive, the method, comprising:
providing a plurality of hard disks;
providing plurality of heads for accessing commands written to or read from the plurality of hard disks;
providing a command queue for storing a plurality of commands to be written to or read from the plurality of hard disks, wherein said plurality of commands defines a queue depth;
providing an expected access time of each of the plurality of commands in the command queue;
providing a dynamically adjustable power consumption variable associated with each of the plurality of commands in the command queue, wherein said dynamically adjustable power consumption variable is a function of said queue depth of said command queue, said power consumption variable is automatically adjusted, based on said depth of said command queue; and
calculating a function of variables associated with each of the plurality of commands.

17. The method of claim 16, wherein the power consumption variable associated with a particular command sets the preference of selecting the particular command from the plurality of commands in the command queue.

18. The method of claim 17, wherein if the power consumption variable is low the associating command is given a selection preference.

19. The method of claim 18, wherein the power consumption variable is dynamically adjustable.

20. The method of claim 16, wherein the command variable functions comprises a seek distance of a command.

21. The method of claim 20, wherein the command variable function further comprises latency data associated with the command.

22. The method of claim 21, wherein command selection preference is given to the command with the lowest power consumption variable.

* * * * *